United States Patent [19]

Ruether et al.

[11] 4,365,112

[45] Dec. 21, 1982

[54] SPEECH DETECTOR CIRCUIT FOR A TASI SYSTEM

[75] Inventors: Peter G. Ruether; John F. O'Neill, both of Boulder, Colo.

[73] Assignee: Storage Technology Corporation, Louisville, Colo.

[21] Appl. No.: 131,159

[22] Filed: Mar. 17, 1980

[51] Int. Cl.³ .............................................. H04J 6/02
[52] U.S. Cl. ............................ 179/1 SC; 179/15.55 T; 370/81
[58] Field of Search ........... 179/1 SC, 1 SA, 15.55 T, 179/1 P, 1 VC, 15.55 R; 370/81

[56] References Cited

U.S. PATENT DOCUMENTS

| | | | |
|---|---|---|---|
| 3,504,352 | 3/1970 | Stromswold et al. | 179/15.55 T |
| 3,520,999 | 7/1970 | May, Jr. | 179/1 SC |
| 3,649,766 | 3/1972 | La Marche | 370/81 |
| 3,706,091 | 12/1972 | May, Jr. | 340/347 DD |
| 3,801,747 | 4/1974 | Queffeulou et al. | 179/1 SC |
| 3,832,491 | 8/1974 | Sciulli et al. | 179/1 VC |
| 3,832,493 | 8/1974 | Clark | 179/81 |
| 3,882,458 | 5/1975 | Hoeschele, Jr. et al. | 179/1 VC |
| 3,936,611 | 2/1976 | Poole | 179/15.55 T |
| 4,028,496 | 6/1977 | La Marche et al. | 179/1 SC |
| 4,052,568 | 10/1977 | Jankowski | 179/81 |

FOREIGN PATENT DOCUMENTS 1147256 4/1969 United Kingdom .
1434483 5/1976 United Kingdom .

Primary Examiner—Gerald L. Brigance
Attorney, Agent, or Firm—Woodcock, Washburn, Kurtz, Mackiewicz & Norris

[57] ABSTRACT

Disclosed is a centralized circuit for determining whether input signals from a plurality of channels are speech which includes memory means in which digital amplitude samples from each of the input channels are stored in real time. A control means then periodically retrieves the samples from the memory in a time faster than real time and produces a series of time compressed input signals which are compared with a variable threshold derived from a stored level for each channel. Moreover, means are disclosed for setting a new threshold whenever the time compressed input signals differs from the old level for a predetermined time, the new level thereafter being stored in place of the previously stored old level.

9 Claims, 4 Drawing Figures

REAL TIME INPUT TO TIME SPEEDUP MEMORY

FAST OUTPUT OF TIME SPEEDUP MEMORY

SPEECH DETECTOR CIRCUIT FOR A TASI SYSTEM

BACKGROUND OF THE INVENTION

This invention relates to time assignment speech interpolation systems and, more particularly, to a speech detector for such systems.

Because of the extremely high cost of communications transmission facilities, e.g., satellite channels and undersea transmission lines, the prior art has sought various means to maximize the efficiency of existing transmission facilities. One such system is known as a time assignment speech interpolation (TASI) system. In a typical TASI system, calls from n callers are transmitted across, for example n/2 transmission facilities to a remote location. At that location, the n/2 facilities are connected to n output channels. TASI systems operate on the assumption, verified as a statistical fact, that at any given time not all callers will wish to talk simultaneously. In fact, as a general rule, callers are actively talking less than half of the time the talker and the listener are interconnected. Accordingly, TASI systems may be defined as switching systems which interconnect talker and listener only when the talker is actively speaking, provided there is a transmission facility available at that time.

In TASI systems, an input channel is connected to a transmission facility only when a speech signal is detected on that channel by a speech detector. It is desirable that such a speech detector have a variable threshold so that speech may be distinguished from noise even when speech characteristics and ambient noise vary.

In the ideal situation, it is desirable that speech be continuously monitored on each input channel and that the speech detection threshold be frequently updated to reflect changes in the ambient conditions on each input channel. However, in the past, such an arrangement required that each input channel have a separate speech detector associated therewith which greatly increases the cost and complexity of speech detection circuitry.

Accordingly, the prior art has employed centralized speech detectors which are time shared among the various input channels. In this regard, see U.S. Pat. No. 3,520,999—May. The use of centralized speech detection elimintes some duplication of circuit components, however, this benefit is achieved at the expense of the ability to continuously monitor each input channel, since while a time shared speech detector is monitoring one channel other channels are not monitored.

In a centralized speech detector, such as that disclosed by May, each input channel is provided with a level detector which provides a signal proportional to the amplitude of the input signal amplitude on a particular channel at a given time. This signal is then directed to a centralized comparison means where the signal amplitude is compared against a stored threshold for that channel.

It would be desirable to provide a centralized speech detector circuit which includes a centralized amplitude detector as opposed to the distributed level detectors employed by May. More importantly, in the May approach, speech is determined to be present when the amplitude of the input signal exceeds a stored threshold at a particular time. However, at any one time, only one input channel may be monitored. It would be desirable to continuously monitor all input channels in order to provide a speech detector circuit which continuously monitors the signals on all input channels on a centralized basis. Speech is then determined to be present only when the average input signal power over an extended period of time exceeds a stored threshold.

In U.S. Pat. No. 4,028,496 to LaMarche, a speech detection circuit is employed in which the threshold against which the instantaneous input signal sample is compared is the short term running average of the previous samples. However, LaMarche, like May, does not observe the input signal over an extended period of time. It would be desirable to compare the input signal power over a period of time, vis a vis a stored threshold, rather than to compare the instantaneous input signal sample versus a threshold as shown by LaMarche and May and to do so on a centralized basis.

SUMMARY OF THE INVENTION

In accordance with the present invention, in conjunction with a time division switching network, each input channel is sampled continuously and the speech signal samples from all channels are directed to a centralized time speed-up memory. Stated another way, the signal samples from each input channel are obtained over a period of time and are continuously read into a centralized memory at a particular input rate and subsequently read out of that memory at a faster rate. Thus, the centralized time speed-up memory contains the entire recent past signal history for each channel. The time compressed amplitude history for each channel is compared in a centralized comparison means. Since the signal history is time compressed, a single, centralized comparison means may be utilized on a time shared basis and yet each of the input channels may be continuously monitored.

RELATED PATENTS & APPLICATIONS

U.S. Pat. No. 4,153,816 entitled, "Time Assignment Speech Interpolation Communication System with Variable Delays" to William A. Morgan, and U.S. Pat. No. 4,184,051 entitled, "Digital Memory Providing Fixed and Variable Delays in a TASI System" to Glenn R. Clingenpeel, describe a TASI system upon which the present invention is a improvement and also U.S. Pat. No. 4,165,449 to P. A. Vachon, "Echo Suppressor Circuit", describes an echo suppressor useful in conjunction with the present invention. The disclosures of these patents incorporated herein by reference.

DESCRIPTION OF THE PREFERRED EMBODIMENT

Figure 1:
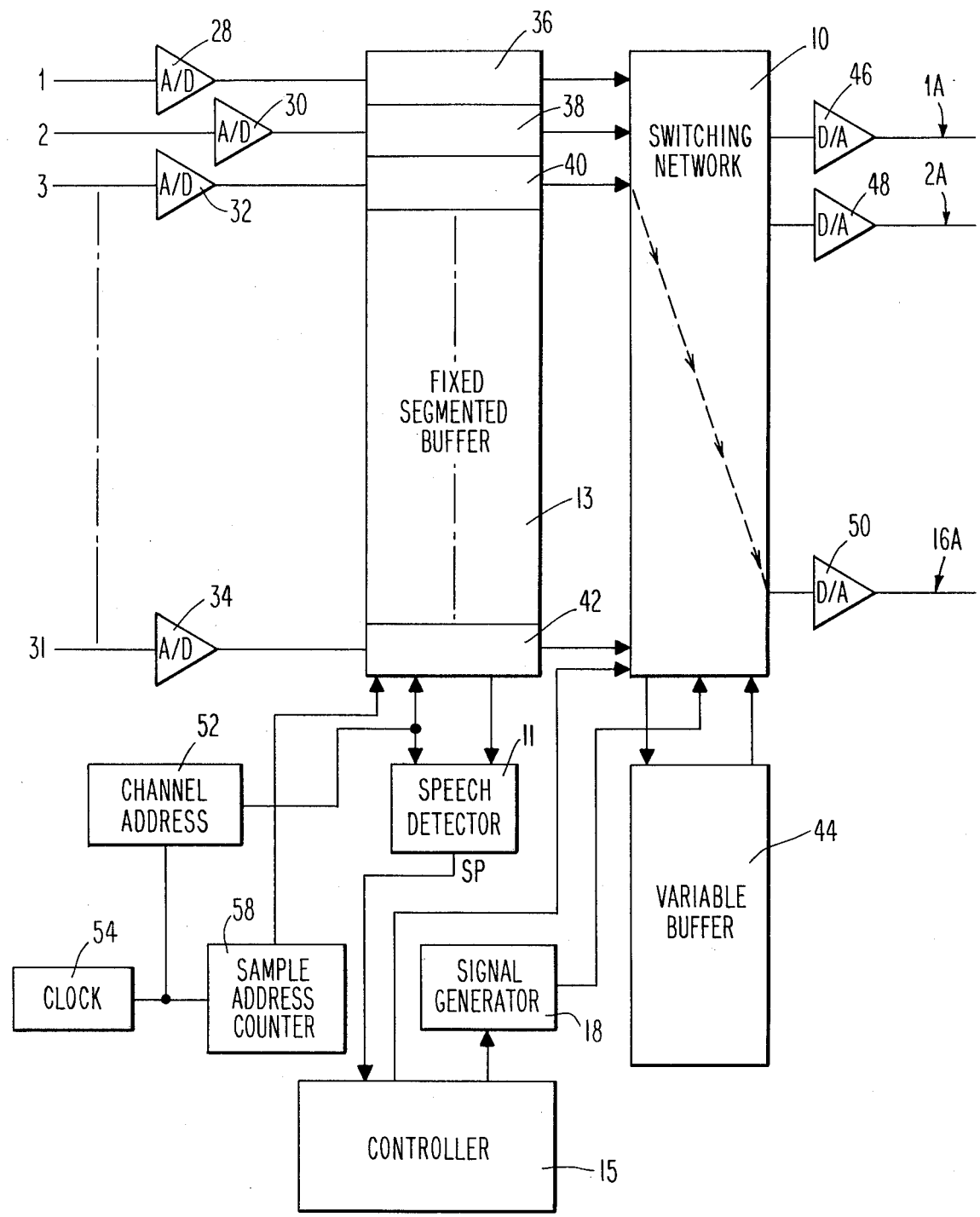
FIG. 1 is a block diagram of the sending side of a TASI system.

Before describing the present invention, the sending side of a TASI system will first be described with reference to FIG. 1.

In this example, there are 31 input channels of which only channels 1, 2, 3, and channel 31 have been shown. As is conventional in such systems, signals from the input channels after passing through an echo suppressor such as that described in the aforementioned Vachon patent, are applied to a switching network 10 which selectively connects speech signals on an input channel, 1 . . . 31, to an available transmission facility, 1A . . . 16A. Only transmission facilities 1A, 2A, and 16A have been shown. Typically, there are about half as many transmission facilities as there are input channels. A central speech detector circuit 11 detects the presence of a speech signal on an input channel. In response to the detection of a speech signal on the input channel, a controller 15 produces a signal which operates switching network 10 to connect the input channel to an available transmission facility. FIG. 1 shows input channel 3 connected to transmission facility 16A.

A fixed delay buffer or memory means 13 is connected between each of the input channels and the switching network 10. Incoming signals are stored in fixed delay buffer 13 for a time interval during which a symbol from signalling generator 18 is applied to the transmission facility. This symbol from signalling generator 18 identifies the input channel to which each transmission facility has been assigned at a given time. For example, assume transmission facility 16A has been assigned to input channel 3. Signalling generator 18 generates a symbol representing input channel 3. This symbol is applied to the transmission facility 16A before the speech signal, sometimes referred to as a speech burst. The delay provided by fixed buffer 13 thus provides the time interval required to insert the symbol before the speech signal. At the receiving side, the symbol identifying input channel 3 is utilized to route the conversation from input channel 3 to the appropriate party.

Input signals from the input channels 1 . . . 31 are converted into digital (P.C.M.) form by means of the analog-to-digital converters 28, 30, 32, 34 and others. In the preferred embodiment, the sampling rate of each of these analog-to-digital converters is 8000 samples per second. Thus, each sample of an incoming signal represents the amplitude of the signal on each input channel over a 0.000125 second interval. The most recent of these samples are stored on a per channel basis in identifiable segments 36, 38, 40, 42, and others of fixed delay buffer 13. In the preferred embodiment, the 256 most recent samples from each input channel are stored in the segment associated with that channel. These digital amplitude samples, when retrieved from fixed delay buffer 13, may be stored for variable times in variable delay buffers 44, and then transmitted on a facility when a facility becomes available. This is described in the aforementioned Clingenpeel patent. Prior to transmission, the digital samples are reconstituted to analog by the digital-to-analog converters 46, 48, 50, and others before the signals are applied to the transmission facilities 1A . . . 16A.

In accordance with the present invention, samples stored in the fixed delay buffer 13 in addition to being directed to the switching network 10 are also directed to the centralized speech detector circuit 11. However, for application to the speech detector 11, these samples are retrieved on a channel by channel basis. The channel being retrieved at any given time is determined by the count of channel address counter 52 which is driven by a clock means 54. In the preferred embodiment, the most recent 128 of the 256 samples stored from each channel are delivered to speech detector circuit 11 by the sample address counter 58 which is also driven by clock means 54 before samples from the next channel are retrieved.

In accordance with the present invention, the samples retrieved from fixed delay buffer 13 are retrieved by the clock means 54 and counters 52 and 58 in a time faster than real time. In the preferred embodiment, samples are retrieved at a rate of 1024 K Hz., or 128 times faster than real time. In this manner, digital samples representing input signal amplitudes over a relatively long period of real time may be retrieved in an interval many times faster than real time. In accordance with the preferred embodiment, every 0.000125 second, 128 samples are retrieved which represent the input signal history for a particular channel which had been accumulated over a 0.016 sec. interval. In this manner, the amplitude history for all channels may be continually monitored with a single centralized speech detector.

Figure 2A:
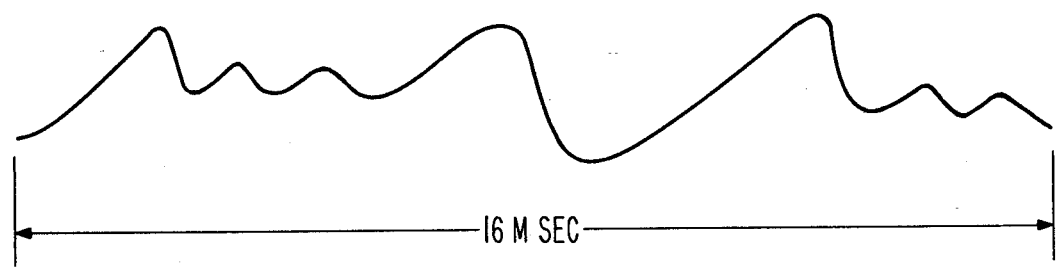
FIG. 2A–2B are waveforms depicting the operation of the present invention.
Figure 2B:
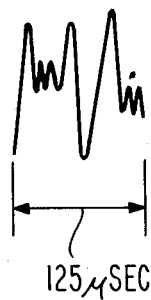

FIG. 2A depicts an input signal on an input channel, such as channel 1, over a 16 millisecond period of time. This signal is continuously smapled at 125 microsecond intervals and the samples are stored in fixed delay buffer 13. The samples are readout and reconstituted by digital-to-analog converter 60 into the time compressed signal shown in FIG. 2B. FIG. 2B depicts the signal power in the input signal for our channel which occurs over the 0.016 second interval shown in FIG. 2A but compressed in time, e.g. by a factor of 128:1.

Figure 3:
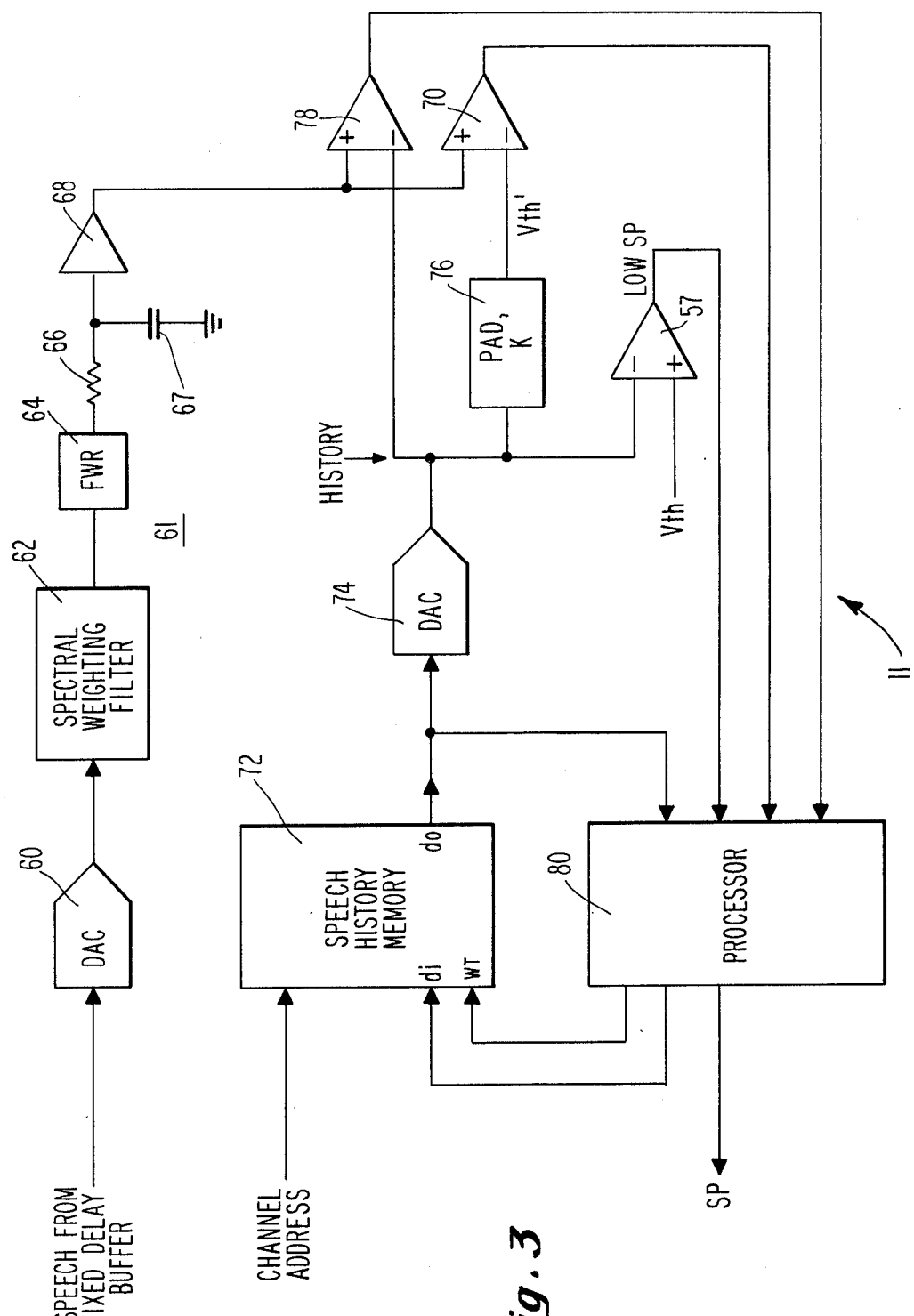
FIG. 3 is a block diagram of the centralized speech detector circuit of the present invention.

Referring now to FIG. 3, the centralized speech detector of the present invention will be described in detail. As shown in FIG. 3, the time compressed signal from a particular input channel is directed from fixed delay buffer 13 to a digital-to-analog converter 60, the output of which is exemplified in FIG. 2B described above.

The output of the digital-to-analog converter 60 is directed to a speech envelope detector shown generally at 61.

The speech envelope detector comprises a spectral weighting filter 62, a full wave rectifier 64 and an RC circuit comprising a resistor 66 and a capacitor 67.

The spectral weighting filter smooths and shapes the signal and weights it heavily in the 800–900 Hz. range in which speech normally occurs. The output of the spectral weighting filter 62 is rectified and applied to the RC circuit 66, 67, the output of the speech envelope detector 61 being the voltage across capacitor 67.

The output of the speech envelope detector 61 is a voltage proportional to the average power of the input signal for a particular input channel taken over a 0.016 second interval. This voltage is amplified by an amplifier 68 and applied to a first comparison means 70 for comparing the time compressed input signal for each channel with the variable threshold $V_{thl}$ for that channel. The purpose of the amplifier 68 is to ensure that the comparison means 70 operates in the proper range. The old speaker level for each of the input channels is stored in a speech history storage means 72 which comprises a digital memory containing an 8 bit byte representing the old speaker level for each input channel. These 8 bit bytes representing the old speaker level for each channel are retrieved at the control of channel address counter 52 and converted into analog signals by digital-to-analog converter 74, the output of which is directed, via Pad 76, to the first comparison means 70. Whenever the average power of the time compressed input signal exceeds the variable threshold $V_{thl}$, the comparator 70 produces a speech present (SP) signal which is directed to processor 80. $V_{thl}$ is the old threshold for each channel and is merely a value specified by Pad 76 which is K db below the old speaker level. In the preferred embodiment, K is 9 db. The speech present signal SP is directed from processor 80 to the controller 15 so that switching may be accomplished.

The speech detector circuit of the present invention also includes a means for setting a new threshold for each channel whenever the average power of the time compressed input signal differs from the old speaker level stored in the speech history memory 72. The means for setting a new threshold comprises a servo loop including a second comparison means 78, processor 80 and the aforementioned speech history storage means 72. The comparator 78 compares the time compressed input signal with the old speaker level as stored in the speech history memory 72 after that speaker level has been reconstituted to analog form via digital-to-analog converter 74.

If the incoming signal power on a particular channel exceeds the old speaker level for that channel, the processor 80 increments the old speaker level stored in the speech history memory 72 to a new and higher level for the next time that an input signal is compared for that channel. If the incoming signal power is below the old speaker level sotred in speech history memory 72, the processor 80 reduces the old speaker level to a new and lower threshold for the next time an input signal on that channel is monitored.

Since it is not advantageous to update the old speaker level as stored in speech history memory 72 instantaneously, the microprocessor 80 ensures that the old speaker level for each channel is updated only after a minimum time such as 0.016 seconds has elapsed. Moreover, in accordance with the preferred embodiment of the present invention, processor 80 permits the updating of the old speaker level stored in memory 72 only when speech is present as determined by the output of the first comparison means 70. In this manner, the variable threshold is only adjusted by a speaker's volume and not by noise.

While a particular embodiment has been shown and described, it will, of course, be understood that various modifications may be made without departing from the principals of the present invention. The apended claims, are therefore, intended to cover any such modification within the true spirit and scope of the invention.

What is claimed is:

1. A centralized circuit for determining whether input signals from a plurality of channels are speech, said circuit comprising:
   a sampling means associated with each of said input channels for continuously providing digital samples of the input signals on each of said channels;
   a memory means for storing said samples from each channel, said samples being stored at a first rate;
   a means for retrieving said samples on a selected channel at a second rate, greater than said first rate to produce a time compressed input signal for each channel;
   a first means for comparing the power of said time compressed input signal against a selected threshold whereby speech is determined to be present when said threshold is exceeded.

2. The circuit of claim 1 further comprising:
   a storage means for storing a representation of the old speech level for each channel, said threshold being derived therefrom, and said first comparing means being responsive thereto.

3. The circuit of claim 2 wherein said storage means stores a separate old speech level for each of said channels and wherein said storage means is responsive to said retrieval means whereby said selected threshold is derived from the old speech level of said selected channel.

4. The circuit of claim 3 further comprising:
   a means for setting a new speech level for each channel whenever said time compressed signal differs from said old speech level for a predetermined time.

5. The circuit of claim 4 wherein said means for setting a new speech level comprises:
   a second means for comparing said time compressed input signal with said old speech level; and
   a processor responsive to said second comparing means, said old speech level stored in said storage means being incremented by said processor whenever the power of said time compressed input signal is greater than and decremented whenever the power of said time compressed input signal is less than said old level for a predetermined time.

6. The circuit of claim 1 wherein said second rate is 128 times faster than said first rate.

7. The circuit of claim 6 wherein said first rate is 8000 samples per sec. and wherein said second rate is 1,024,000 samples per second.

8. A centralized circuit for determining whether input signals from a plurality of channels are speech, said circuit comprising:
   a sampling means associated with each of said channels for continuously providing digital amplitude samples of the input signals on each of said channels;
   a memory means for storing said digital amplitude samples of said input signals from each channel in real time;
   a means for retrieving said samples from each one of said channels in a time faster than real time to produce a series of time compreessed input signals;
   a storage means responsive to said retrieval means for storing an old speech level for each of said channels;
   a first means for comparing the power of the time compressed input signal for each channel with the speech level threshold for that channel, said threshold being derived from said old speech level for that channel, speech being present when said threshold is exceeded.

9. The circuit of claim 1 further comprising:
   a means for setting a new speech level for each channel whenever said time compressed input signal differs from said old speech level for a predetermined time, said new speech level thereafter being stored in said storage means in place of said old speech level.

\* \* \* \* \*